United States Patent
Naamneh

(10) Patent No.: US 11,810,117 B1
(45) Date of Patent: Nov. 7, 2023

(54) SYSTEMS AND METHODS FOR PROTECTING CUSTOMER PAYMENT DATA AGAINST MALWARE ATTACKS ON INLINE FRAME PAYMENT FORMS

(71) Applicant: GEN DIGITAL INC., Tempe, AZ (US)

(72) Inventor: Bahaa Naamneh, Oslo (NO)

(73) Assignee: GEN DIGITAL INC., Tempe, AZ (US)

( * ) Notice: Subject to any disclaimer, the term of this patent is extended or adjusted under 35 U.S.C. 154(b) by 0 days.

(21) Appl. No.: 17/382,132

(22) Filed: Jul. 21, 2021

(51) Int. Cl.
  G06Q 20/40 (2012.01)
  G06Q 20/02 (2012.01)
  H04L 9/40 (2022.01)

(52) U.S. Cl.
  CPC ....... *G06Q 20/4016* (2013.01); *G06Q 20/027* (2013.01); *G06Q 20/407* (2013.01); *H04L 63/145* (2013.01)

(58) Field of Classification Search
  None
  See application file for complete search history.

(56) References Cited

U.S. PATENT DOCUMENTS

| | | | | |
|---|---|---|---|---|
| 8,341,744 B1* | 12/2012 | Obrecht | .............. | H04L 63/1416 713/188 |
| 8,768,838 B1* | 7/2014 | Hoffman | ................ | G06Q 40/00 705/72 |
| 2006/0116900 A1* | 6/2006 | Jensen | ................... | G06Q 30/06 705/1.1 |
| 2008/0109875 A1* | 5/2008 | Kraft | ................... | G06F 21/6245 726/2 |
| 2010/0161816 A1* | 6/2010 | Kraft | ..................... | G06Q 30/02 709/229 |
| 2021/0058395 A1* | 2/2021 | Jakobsson | ............. | H04L 67/306 |

OTHER PUBLICATIONS

Murdoch et al., "Verified by Visa and MasterCard SecureCode:Or, How Not to Design Authentication", Financial Cryptography and Data Security, Lecture Notes in Computer Science, vol. 6052, 2010, pp. 336-342.

* cited by examiner

*Primary Examiner* — Bruce I Ebersman
*Assistant Examiner* — Matthew Cobb
(74) *Attorney, Agent, or Firm* — Greenberg Traurig, LLP

(57) ABSTRACT

The disclosed computer-implemented method for protecting customer payment data against malware attacks on inline frame payment forms may include (i) detecting a payment form in a payment page on an online merchant website (e.g., by monitoring the website for a user entry of payment information during a customer transaction session or by analyzing, in hypertext markup language associated with an inline frame (iframe), a document object model (DOM)) to identify the payment form, (ii) identifying the iframe on the online merchant website, (iii) determining whether the iframe is associated with a trusted domain utilized for processing the payment information to complete the customer transaction session, and (iv) performing a security action that protects against a potential malware attack by preventing completion of the customer transaction upon determining that the iframe is unassociated with the trusted domain. Various other methods, systems, and computer-readable media are also disclosed.

20 Claims, 7 Drawing Sheets

SYSTEMS AND METHODS FOR PROTECTING CUSTOMER PAYMENT DATA AGAINST MALWARE ATTACKS ON INLINE FRAME PAYMENT FORMS

BACKGROUND

Online merchants providing electronic commerce (e-commerce) services to consumers often utilize payment service providers (also known as PSPs or payment gateways) for processing financial transactions (e.g., credit card payments) for purchased goods and services to take advantage of enhanced security features. For example, e-commerce websites may utilize hypertext markup language (HTML) inline (iframe) payment forms hosted by PSPs (in lieu of providing their own payment forms) as PSP hosted iframe forms are protected by Same Origin Policy (SOP) security mechanisms thereby allowing credit card information to be sent securely from the consumer directly to a participating PSP.

The use of PSPs by online merchant e-commerce websites, however, suffer from a number of drawbacks. For example, the malicious actors may easily bypass the security provided by hosted iframes through the injection of intermediate "fake" iframes on e-commerce websites (i.e., a formjacking attack). As a result, unsuspecting consumers may unwittingly enter their credit card information into these fake iframes (instead of legitimate PSP hosted iframes), resulting in the theft of their personal financial information.

SUMMARY

As will be described in greater detail below, the present disclosure describes various systems and methods for protecting customer payment data against malware attacks on inline frame payment forms.

In one example, a method for protecting customer payment data against malware attacks on inline frame payment forms may include (i) detecting a payment form in a payment page on an online merchant website (e.g., by monitoring the website for a user entry of payment information during a customer transaction session or by analyzing, in HTML associated with an inline frame (iframe), a document object model (DOM)) to identify the payment form, (ii) identifying theiframe on the online merchant website, (iii) determining whether the iframe is associated with a trusted domain utilized for processing the payment information to complete the customer transaction session, and (iv) performing a security action that protects against a potential malware attack by preventing completion of the customer transaction upon determining that the iframe is unassociated with the trusted domain.

In some examples, a browser extension may be utilized to monitor the online merchant website and detect the user entry of a payment account number on the payment page (e.g., a credit card number). In some embodiments, the iframe may be identified by parsing HTML representing the payment page.

In some examples, the iframe may be validated against a list of trusted hosted iframe locations provided by a payment gateway to determine whether it is associated with a trusted domain utilized for processing the payment information. Additionally or alternatively, a primary domain associated with the online merchant website may be identified in HTML representing the payment page to determine if the iframe is associated with a trusted domain utilized for processing the payment information. Additionally or alternatively, a subdomain associated with the online merchant website may be identified in HTML representing the payment page to determine if the iframe is associated with a trusted domain utilized for processing the payment information.

In some embodiments, the security action may include (i) alerting the user that the iframe is suspicious and (ii) notifying the user of telemetry associated with the suspicious iframe. In some examples, the telemetry may include an identification of a potentially malicious website associated with the suspicious iframe. Additionally or alternatively, the telemetry may include user instructions for evading the potential malware attack. In some examples, the suspicious iframe may be a fake iframe injected into the online merchant website by a malicious actor.

In one embodiment, a system for protecting customer payment data against malware attacks on inline frame payment forms may include at least one physical processor and physical memory that includes computer-executable instructions and a set of modules that, when executed by the physical processor, cause the physical processor to (i) detect, by a detection, a payment form in a payment page on an online merchant website (e.g., by monitoring the website for a user entry of payment information during a customer transaction session or by analyzing, in HTML associated with an inline frame (iframe), a document object model (DOM)) to identify the payment form, (ii) identify, by an identification module, the iframe on the online merchant website, (iii) determine, by a determining module, whether the iframe is associated with a trusted domain utilized for processing the payment information to complete the customer transaction session, and (iv) perform, by a security module, a security action that protects against a potential malware attack by preventing completion of the customer transaction upon determining that the iframe is unassociated with the trusted domain.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detects a payment form in a payment page on an online merchant website (e.g., by monitoring the website for a user entry of payment information during a customer transaction session or by analyzing, in HTML associated with an inline frame (iframe), a document object model (DOM)) to identify the payment form, (ii) identify the iframe on the online merchant website, (iii) determine whether the iframe is associated with a trusted domain utilized for processing the payment information to complete the customer transaction session, and (iv) perform a security action that protects against a potential malware attack by preventing completion of the customer transaction upon determining that the iframe is unassociated with the trusted domain.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

Figure 1:
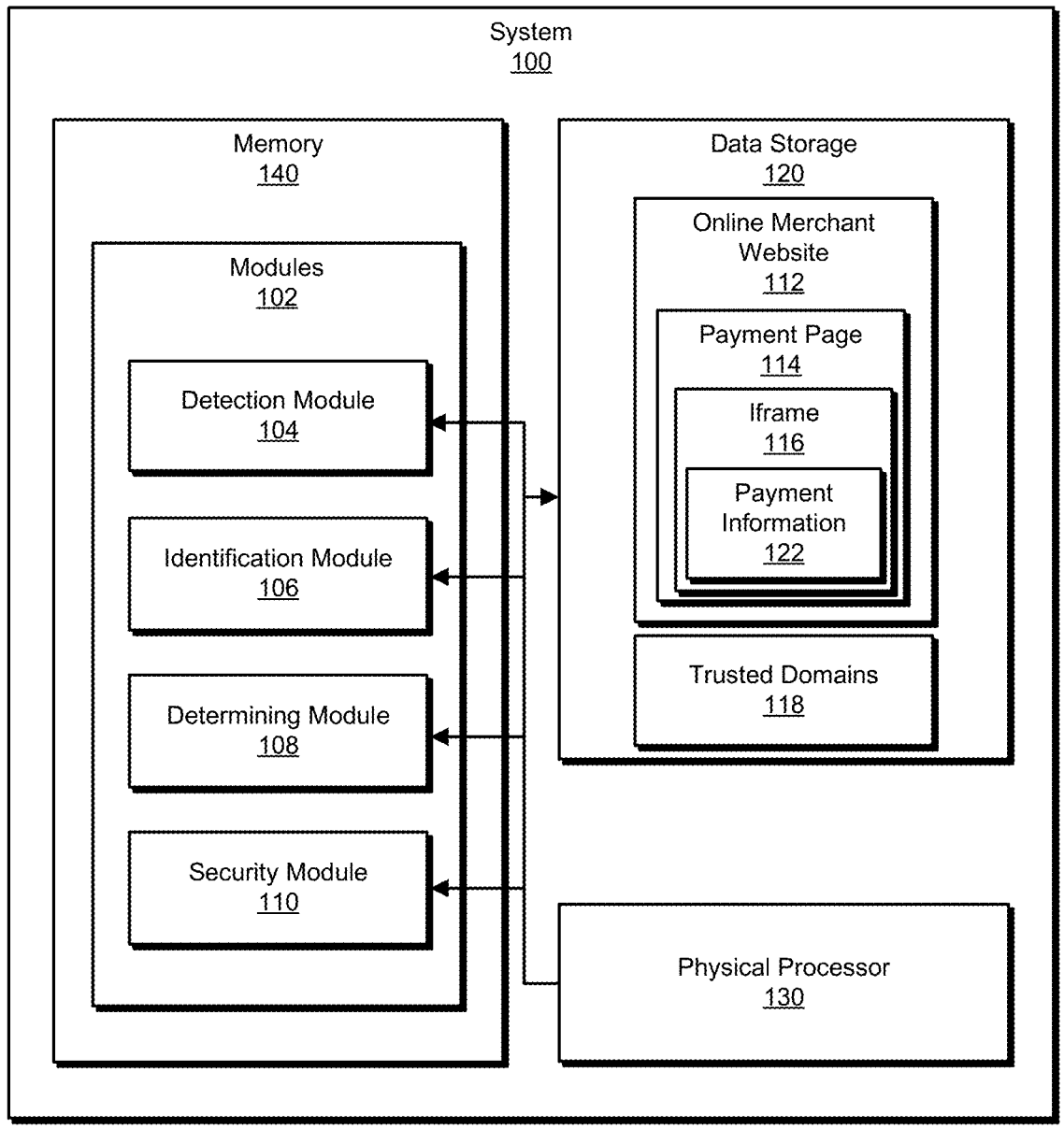
FIG. 1 is a block diagram of an example system for protecting customer payment data against malware attacks on inline frame payment forms.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for protecting customer payment data against malware attacks on inline frame payment forms. As will be described in greater detail below, the systems and methods described herein may maintain a list of trusted hosted inline frame (iframe) locations (e.g., a whitelist) provided by trusted payment gateway providers that may utilized by online merchant websites for processing user payments for purchases. Then a browser extension may be utilized to either monitor user entries of payment information (e.g., credit card numbers) for making online merchant purchases or analyze, in HTML with an iframe, a document object model (DOM) to identify the payment form. Upon determining that a user's payment information is being entered into an iframe, the systems and methods described herein may validate the iframe by checking if the iframe belongs to a trusted domain, such as a primary website domain or subdomain, or one of the trusted payment gateway providers (as determined from the whitelist). If the iframe does not belong to a trusted domain, the systems and methods described herein may generate an alert warning the user of a potential malware attack and generating telemetry that identifies a suspicious website involved in initiating the attack. By validating iframes in this way, the systems and methods described herein may inform and protect users against fake hosted iframe formjacking attacks by allowing credit card numbers to be entered only in iframes that are hosted by an online merchant's primary domain or subdomain, or a domain controlled by a trusted payment gateway provider.

In addition, the systems and methods described herein may improve the field of data privacy by preventing the exfiltration of user payment information from electronic commerce websites by malicious actors injecting fake iframes onto payment pages hosted by an attacker-controlled website domain. Previous solutions that have attempted to address this problem are either vulnerable to phishing attacks or may be bypassed by malicious actors through the injection of fake iframes and/or the skimming of credit card information prior to encryption by payment gateway providers.

Figure 2:
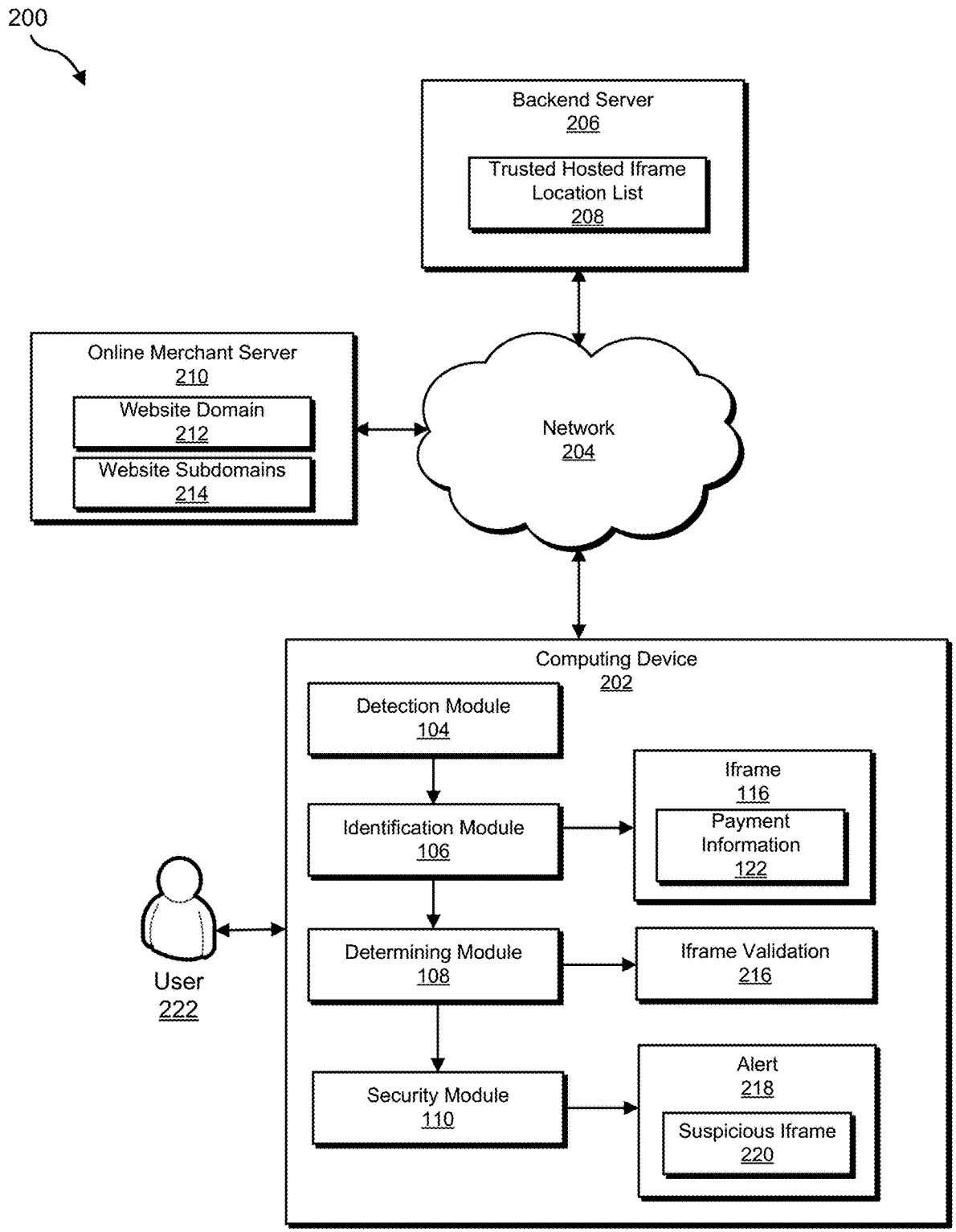
FIG. 2 is a block diagram of an additional example system for protecting customer payment data against malware attacks on inline frame payment forms.
Figure 3:
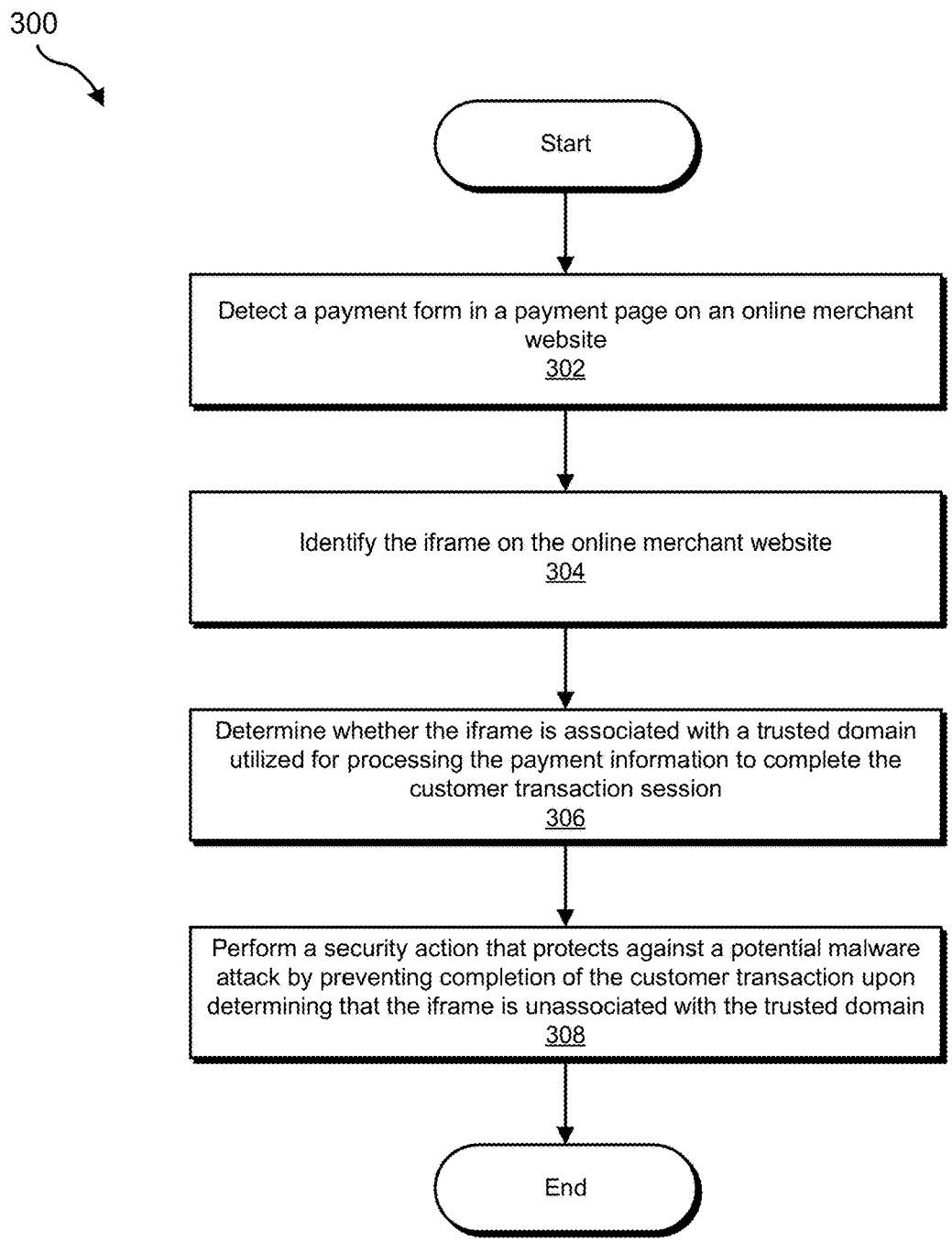
FIG. 3 is a flow diagram of an example method for protecting customer payment data against malware attacks on inline frame payment forms.
Figure 4:
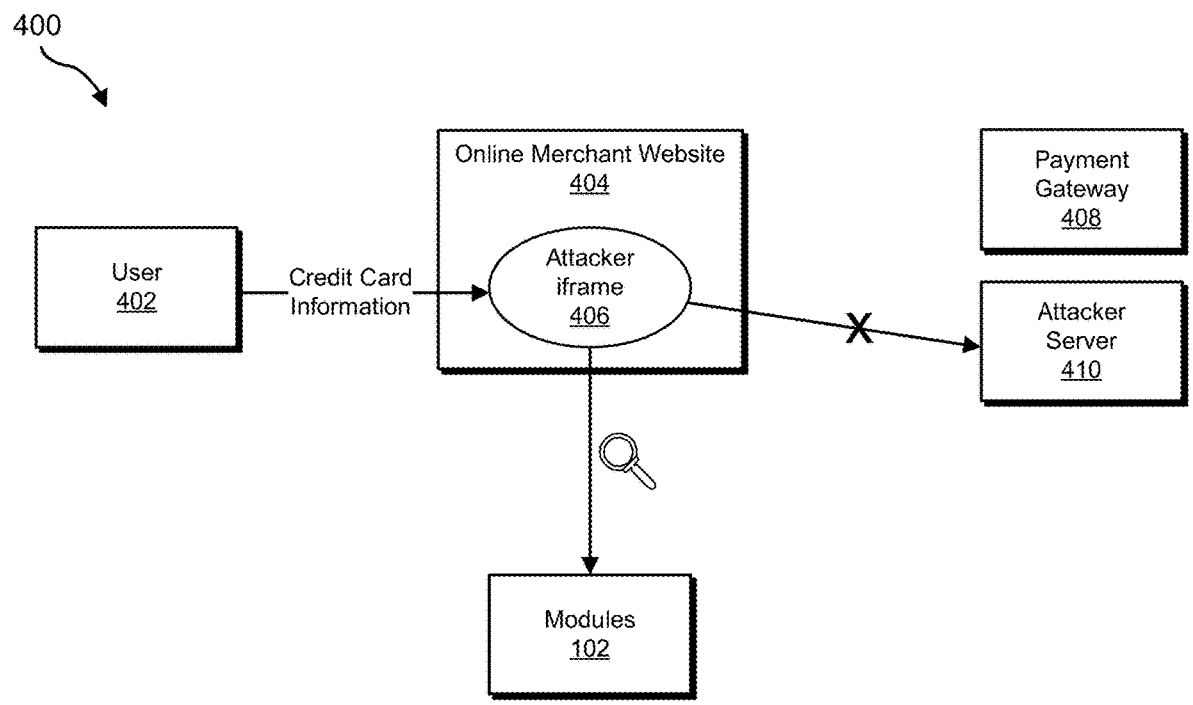
FIG. 4 is a block diagram of an additional example system for protecting customer payment data against malware attacks on inline frame payment forms.

The following will provide, with reference to FIGS. 1-2 and 4, detailed descriptions of example systems for protecting customer payment data against malware attacks on inline frame payment forms. Detailed descriptions of corresponding computer-implemented methods will also be provided in connection with FIG. 3. In addition, a detailed description of a browser display of an online merchant website showing example security actions for protecting customer payment data against malware attacks on inline frame payment forms, will also be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of an example system 100 for protecting customer payment data against malware attacks on inline frame payment forms. As illustrated in this figure, example system 100 may include one or more modules 102 for performing one or more tasks. For example, and as will be explained in greater detail below, example system 100 may include a detection module 104 that detects a payment form in a payment page 114 on an online merchant website 112 (e.g., by monitoring online merchant website 112 for a user entry of payment information 122 during a customer transaction session or by analyzing, in HTML associated with iframe 116, a document object model (DOM)) to identify the payment form. Example system 100 may additionally include an identification module 106 that identifies iframe 116 on online merchant website 112. Example system 100 may also include a determining module 108 that determines whether iframe 116 is associated with a trusted domain 118 utilized for processing payment information 122 to complete the customer transaction session. Example system 100 may additionally include a security module 110 that performs a security action that protects against a potential malware attack by preventing completion of the customer transaction upon determining that iframe 116 is unassociated with a trusted domain 118. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, backend server 206 and/or online merchant server 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to protect customer payment data against malware attacks on inline frame payment forms. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store online merchant website 112 (including payment page 114, iframe 116, and payment information 122) and trusted domains 118.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with backend server 206 and online merchant server 210 via a network 204. In one example, all or a portion of the functionality of modules 102 may be performed by computing device 202, backend server 206, online merchant server 210 and/or any other suitable computing system. As will be described in greater detail below, one or more of modules 102 from FIG. 1 may, when executed by at least one processor of computing device 202, enable computing device 202 to protect customer payment data against malware attacks on inline frame payment forms.

For example, detection module 104 may detect a payment form in payment page 114 on online merchant website 112 (which may be hosted by online merchant server 210) (e.g., by monitoring online merchant website 112 for a user entry of payment information 122 during a customer transaction session or by analyzing, in HTML associated with iframe 116, a document object model (DOM)) to identify the payment form. Next, identification module 106 may identify iframe 116. Then, determining module 108 may determine iframe validation 216 based on whether iframe 116 is associated with a trusted domain 118 (i.e., a website domain 212, a website subdomain 214, or a trusted hosted iframe in trusted hosted iframe location list 208 on backend server 206. Finally, security module 110 may perform a security action (such as generating an alert 218) that protects against a potential malware attack by preventing completion of the customer transaction upon determining that iframe 116 is unassociated with a trusted domain 118 (i.e., a suspicious iframe 220).

Computing device 202 generally represents any type or form of computing device capable of reading computer-executable instructions. In some examples, computing device 202 may be an endpoint device running client-side web browser software for accessing online merchant websites for making purchases. Additional examples of computing device 202 include, without limitation, laptops, tablets, desktops, servers, cellular phones, Personal Digital Assistants (PDAs), multimedia players, embedded systems, smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Backend server 206 generally represents any type or form of computing device that is capable of reading and/or executing computer-readable instructions. In some examples, backend server 206 may be a file server that stores trusted hosted iframe location list 208. In some embodiments, trusted hosted iframe location list 208 may include a list of trusted hosted iframe locations provided by payment gateway companies which provide payment processing services for online merchants. Additional examples of backend server 206 include, without limitation, security servers, web servers, and/or storage servers configured to run certain software applications and/or provide various security, web, and/or storage services. Although illustrated as a single entity in FIG. 2, backend server 206 may include and/or represent a plurality of servers that work and/or operate in conjunction with one another.

Online merchant server 210 generally represents any type or form of computing device that is capable of reading and/or executing computer-readable instructions. In some examples, online merchant server 210 may be an e-commerce server that handles online purchases and purchase (e.g., credit card) transactions. In some examples, online merchant server 210 may be configured to implement an electronic commerce protocol that ensures a secure transmission between clients and cooperating financial institutions. In some examples, online merchant server 210 may include an online storefront and shopping cart infrastructure for facilitating purchases from Internet retailers. Additional examples of online merchant server 210 include, without limitation, security servers, web servers, and/or storage servers configured to run certain software applications and/or provide various security, web, and/or storage services. Although illustrated as a single entity in FIG. 2, online merchant server 210 may include and/or represent a plurality of servers that work and/or operate in conjunction with one another.

Network 204 generally represents any medium or architecture capable of facilitating communication or data transfer. In one example, network 204 may facilitate communication between computing device 202, backend server 206, and online merchant server 210. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for protecting customer payment data against malware attacks on inline frame payment forms. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a payment form in payment page 114 on an online merchant website (e.g., by monitoring the website for a user entry of payment information during a customer transaction session or by analyzing, in HTML associated with an iframe, a document object model (DOM)) to identify the payment form. For example, detection module 104 may, as part of computing device 202 in FIG. 2, detect a payment form in payment page 114 by monitoring online merchant website 112 for a user entry of payment information 122 during a customer transaction session. Alternatively, detection module 104 may identify a payment form in payment page 114 by analyzing, in HTML associated with iframe 116, a DOM. In some examples, payment information 122 may include credit card account information (e.g., name, card number, card expiration date, etc.) associated with user 222 for making a purchase on online merchant website 112 via payment page 114. Additionally, payment page 114 may include iframe 116 for receiving payment information 122.

The term "iframe" or "inline frame," as used herein, generally refers to any HTML document embedded within another HTML document on a website. An iframe HTML element may be utilized to insert content (such as a payment page for receiving credit card information associated with making a purchase from an online merchant) from another source (such as a third party payment service provider or payment gateway) into a webpage.

Detection module 104 may monitor online merchant website 112 for a user entry of payment information 122 in a variety of ways. In some embodiments, detection module 104 may utilize a web browser extension (i.e., a browser extension) to detect entry of a payment account number (e.g., a credit card number) as it is being typed into iframe 116 by user 222 on online merchant website 112.

At step 304 one or more of the systems described herein may identify an iframe on the online merchant website. For example, identification module 106 may, as part of computing device 202 in FIG. 2, identify iframe 116 utilized by user 222 for entering in payment information 122 for completing a customer transaction on online merchant website 112.

Identification module 106 may identify iframe 116 in a variety of ways. In some examples, identification module 106 may parse the HTML document representing payment page 114 to identify iframe 116. For example, identification module 106 may run a background process that displays the HTML elements for payment page 114 and search for the iframe HTML element utilized for receiving payment information 122.

At step 306 one or more of the systems described herein may determine whether the iframe identified at step 304 is associated with a trusted domain utilized for processing the payment information to complete the customer transaction session. For example, determining module 108 may, as part of computing device 202 in FIG. 2, determine if iframe 116 is trusted by validating it against one or more known trusted domains 118.

The term "trusted domain," as used herein, generally refers to any valid location pointed to by an iframe embedded in an HTML webpage. For example, an iframe location that points to a main domain or a subdomain associated with an online merchant website in which an iframe is embedded may be considered to be a trusted domain. Additionally or alternatively, an iframe location that points to a payment gateway utilized by an online merchant (i.e., a payment gateway trusted hosted iframe location), may also be considered to be a trusted domain.

Determining module 108 may determine if iframe 116 is trusted in a variety of ways. In some examples, determining module 108 may validate iframe 116 against trusted hosted iframe location list 208 (e.g., a whitelist provided by one or more payment gateways) on backend server 206. In particular, determining module 108 may determine if a location pointed to by iframe 116 matches a location in trusted hosted iframe location list 208 and, if so, determine that iframe 116 is valid (i.e., non-malicious). Additionally or alternatively, determining module 108 may validate iframe 116 against a primary domain (e.g., website domain 212) or a subdomain (e.g., a website subdomain 214) associated with online merchant website 112. For example, determining module 108 may determine (e.g., from HTML representing payment page 114) if a location pointed to by iframe 116 is either a primary domain (e.g., ONLINEMERCHANT.COM) or a subdomain (e.g., STORE.ONLINEMERCHANT.COM) matching online merchant website 112 and, if so, determine that iframe 116 is valid (i.e., non-malicious). On the other hand, if determining module 108 determines that a location pointed to by iframe 116 does not match any trusted domain 118, then iframe 116 may be determined to be suspicious iframe 220.

At step 308 one or more of the systems described herein may perform a security action that protects against a potential malware attack by preventing completion of the customer transaction upon determining (at step 306) that the iframe is unassociated with a trusted domain. For example, security module 110 may, as part of computing device 202 in FIG. 2, may perform a security action that protects against a potential malware attack (e.g., formjacking or web skimming) by preventing completion of the customer transaction upon determining that iframe 116 is unassociated with a trusted domain (i.e., iframe 116 is suspicious iframe 220).

Security module 110 may perform a security action that protects against a potential malware attack in a variety of ways. In some examples, security module 110 may generate alert 218 that notifies user 222 of suspicious iframe 220 and further provides telemetry associated with suspicious iframe 220 so that user 222 may take preventative actions. For example, FIG. 5 shows a browser display of an online merchant website showing example security actions for protecting customer payment data against malware attacks on inline frame payment forms.

Figure 5:
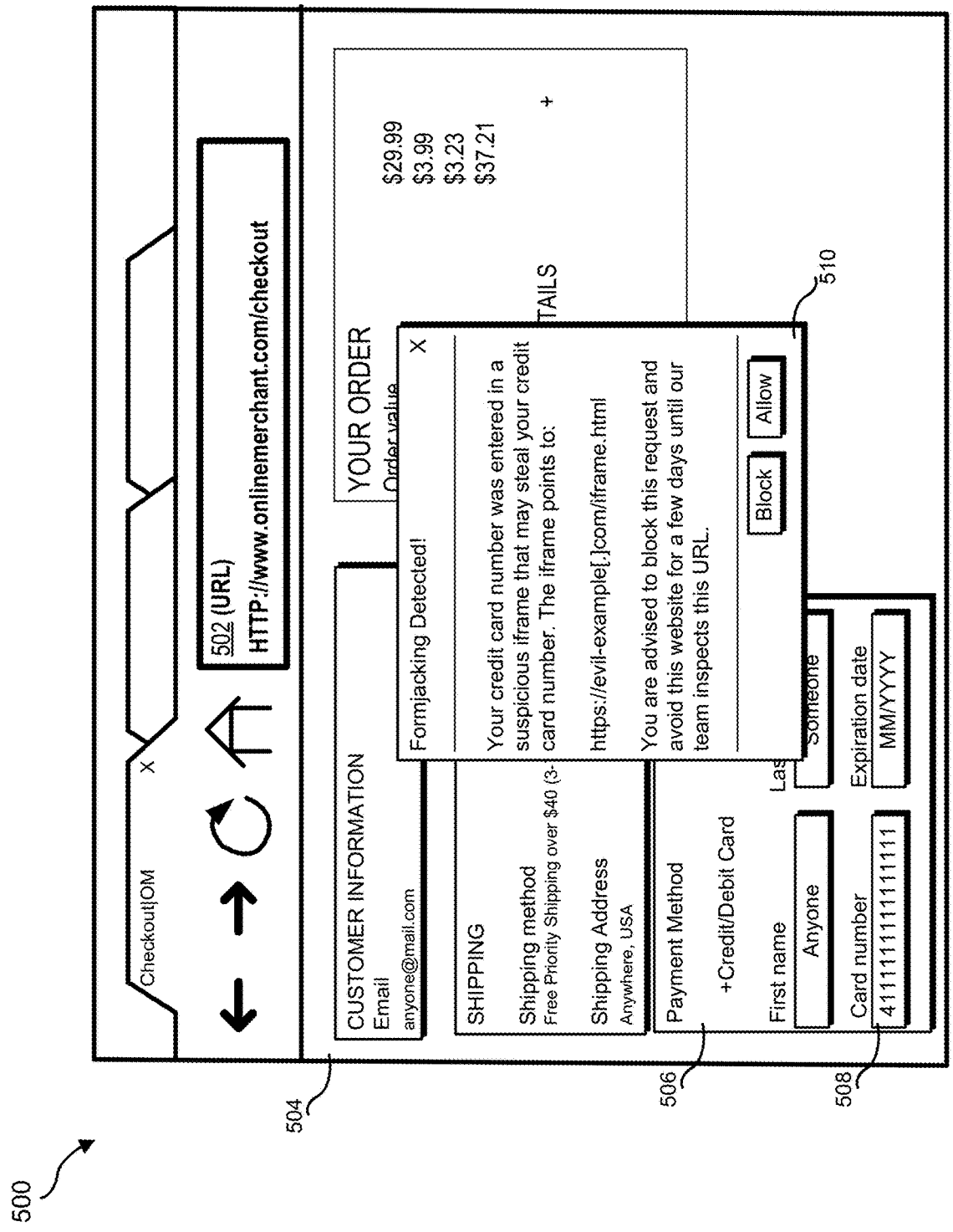
FIG. 5 is a block diagram of a browser display of an online merchant website showing example security actions in an example system for protecting customer payment data against malware attacks on inline frame payment forms.

Turning now to FIG. 5, browser display 500 shows an online merchant website identified by URL 502 utilized for completing customer order transactions. For example, the online merchant website shown in browser display 500 may include customer contact information 504, payment method information 506, and credit card account information 508. Upon determining a suspicious iframe (as described above with respect to step 306 of FIG. 3), a security module (such as security module 110 described with respect to step 308 of FIG. 3) may generate an alert 510 as a pop-up window including a notification that a suspicious iframe has been detected, the identification of a potentially malicious website pointed to by the suspicious iframe (i.e., https://evil-example [.]com/iframe.html), and options for a user to either block or allow a pending browser request to access the suspicious website. In this way, the injection of malicious code into a website (e.g., a formjacking attack) may be identified prior to the code being able to submit extracted customer credit card account information from a completed payment form to an attacker server.

As another example, FIG. 4 is a block diagram of an additional example system 400 for protecting customer payment data against malware attacks on inline frame payment forms. System 400 may include an online merchant website 404 that receives credit card information from a user 402 into an attacker iframe 406 pointing to an attacker server 410. As described above with respect to the method of FIG. 3, modules 102 may monitor the user entry of the credit card information or alternatively, analyze, in HTML associated with an inline frame (e.g., attacker iframe 406), a DOM via a browser extension and then validate attacker iframe 406 against a trusted domain (i.e., a list of trusted hosted iframe locations provided by payment gateway companies (e.g., payment gateway 408)), a primary domain associated with online merchant website 404, and/or a subdomain associated with online merchant website 404. Upon determining attacker iframe 406, modules 102 may then provide options to user 402 including blocking the sending of received credit card information to attacker server 410 as part of a malware attack (e.g., formjacking).

As explained in connection with method 300 above, the systems and methods described herein provide for protecting customer payment data against malware attacks (such as formjacking) on inline frame payment forms. The systems and methods described herein may maintain a whitelist of trusted hosted iframe locations provided by trusted payment gateway providers that may utilized by online merchant websites for processing user payments for purchases. Then a browser extension may be utilized to either monitor user entries of payment information (e.g., credit card numbers) for making online merchant purchases or analyze, in HTML with an iframe, a document object model (DOM) to identify the payment form. Upon determining that a user's payment information is being entered into an iframe, the systems and methods described herein may validate the iframe by checking if the iframe belongs to a trusted domain such as a primary website domain or subdomain, or one of the trusted payment gateway providers (as determined from the whitelist). If the iframe does not belong to a trusted domain, the systems and methods described herein may generate an alert warning the user of a potential malware attack and generating telemetry that identifies a suspicious website involved in initiating the attack. By validating iframes in this way, the systems and methods described herein may inform and protect users against fake hosted iframe formjacking attacks by allowing credit card numbers to be entered only in iframes that are hosted by an online merchant's primary domain or subdomain, or a domain controlled by a trusted payment gateway provider.

Figure 6:
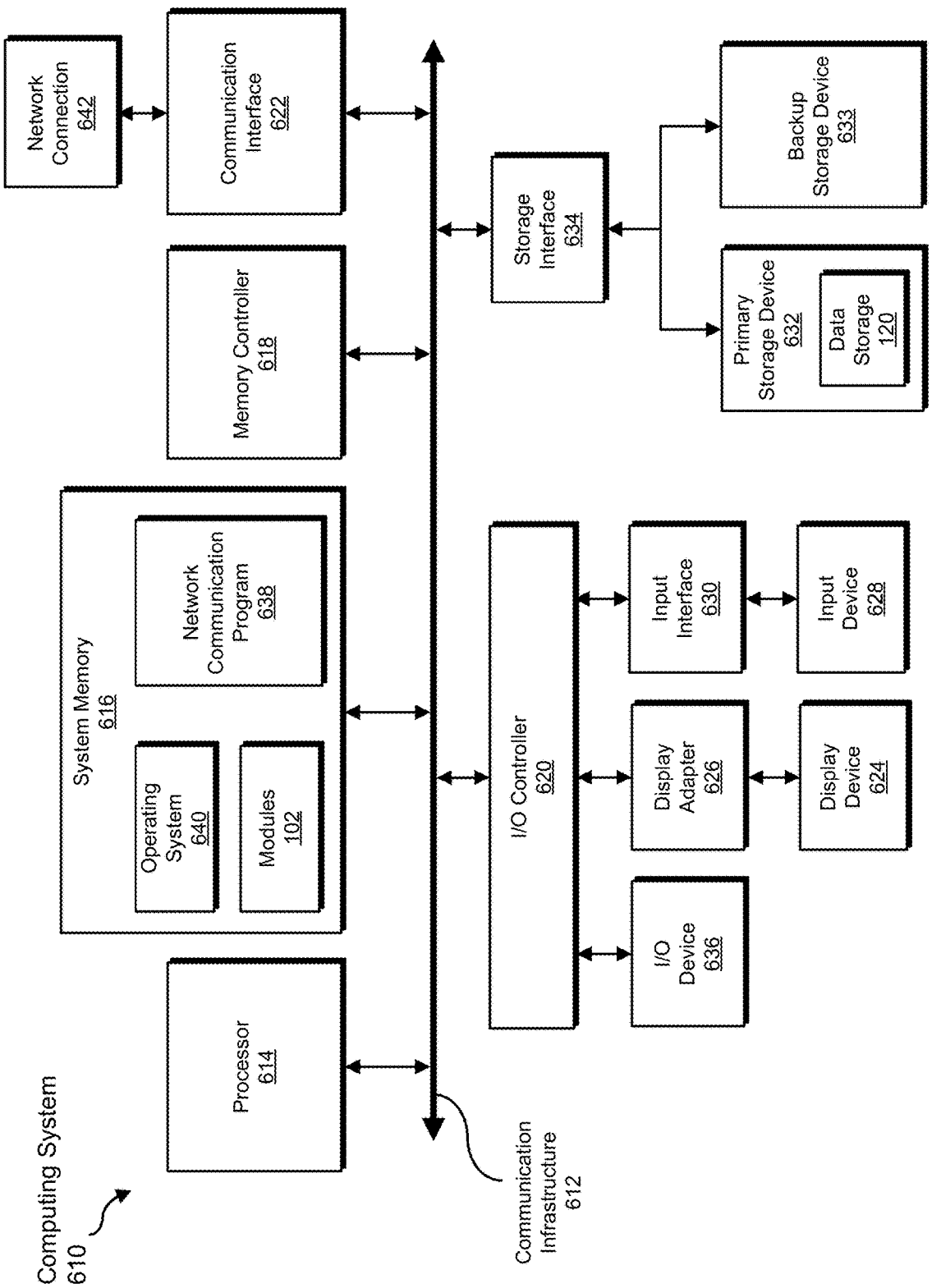
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
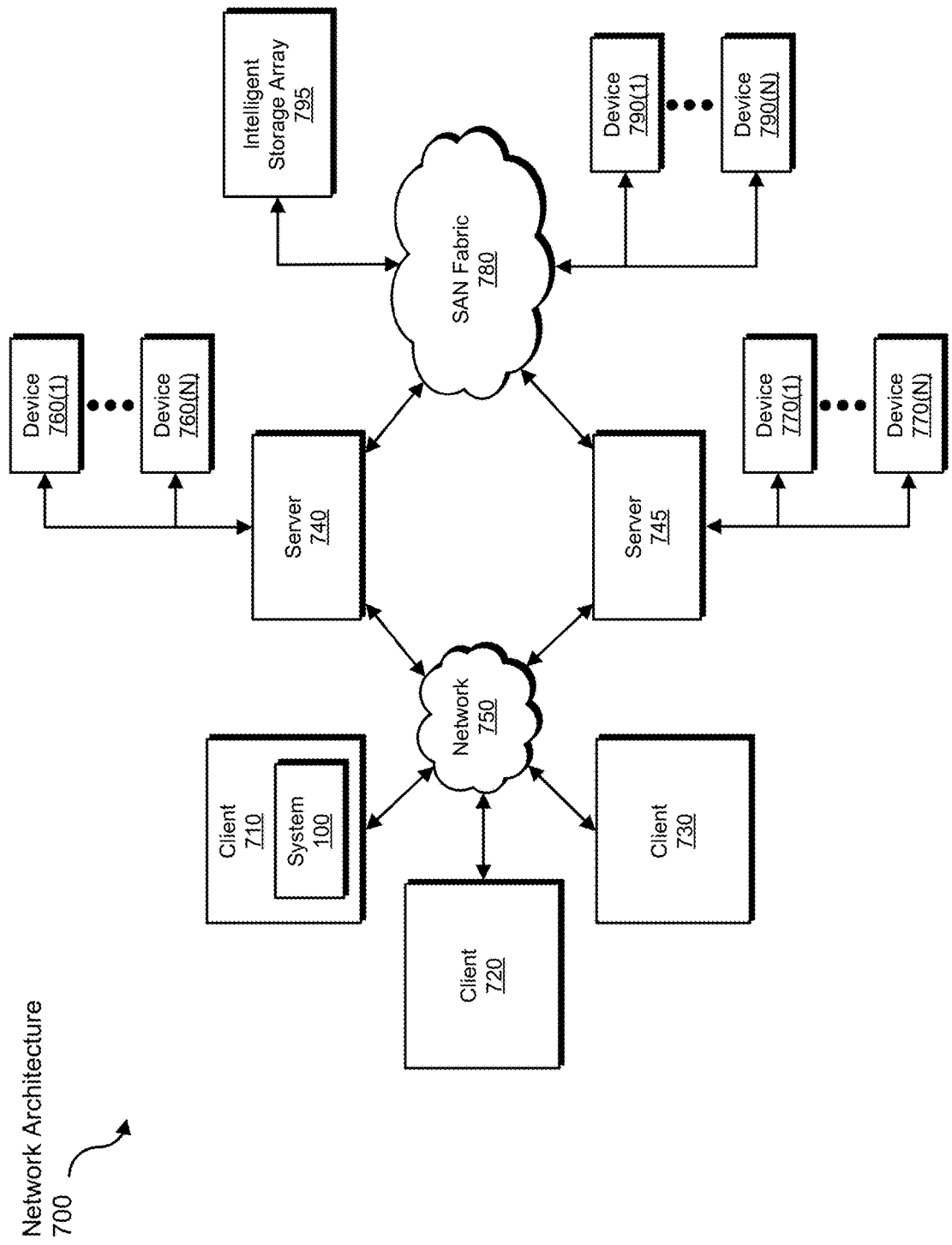
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for protecting customer payment data against malware attacks on inline frame payment forms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting customer payment data against malware attacks on inline frame payment forms, at least a portion of the method being performed by one or more computing devices comprising at least one processor, the method comprising:
   detecting, by the one or more computing devices, a payment form in a payment page on an online merchant website, wherein detecting the payment form comprises analyzing, in hypertext markup language (HTML) associated with an inline frame (iframe) embedded on the payment page, a document object model (DOM) to identify the payment form;
   identifying, by the one or more computing devices, the iframe on the online merchant website, wherein identifying the iframe on the online merchant website comprises parsing HTML comprising the payment page to identify the iframe, wherein parsing the HTML comprising the payment page comprises:
      running a background process that displays one or more HTML elements for the payment page; and
      searching for an iframe HTML element utilized for receiving payment information from a user of the online merchant website to complete a customer transaction session;
   determining, by the one or more computing devices, whether the iframe is associated with a trusted domain utilized for processing the payment information received from the user of the online merchant website to complete the customer transaction session; and
   performing, by the one or more computing devices, a security action that protects against a potential malware attack by preventing completion of the customer transaction session upon determining that the iframe is unassociated with the trusted domain, wherein preventing the completion of the customer transaction session comprises generating a notification, wherein the notification:
      identifies the iframe that is unassociated with the trusted domain as a suspicious iframe; and
      presents, in a user interface window, options to block and allow a pending browser request for accessing a potentially malicious website pointed to by the suspicious iframe, wherein an execution of the option to block the pending browser request is associated with a potential malware attack comprising an extraction of payment information from the payment form.

2. The computer-implemented method of claim 1, wherein determining whether the iframe is associated with a trusted domain utilized for processing the payment information to complete the customer transaction session comprises validating the iframe against a list of trusted hosted iframe locations provided by a payment gateway.

3. The computer-implemented method of claim 1, wherein determining whether the iframe is associated with a trusted domain utilized for processing the payment information to complete the customer transaction session comprises identifying a primary domain associated with the online merchant website in HTML comprising the payment page to determine if the iframe is associated with a trusted domain.

4. The computer-implemented method of claim 1, wherein determining whether the iframe is associated with a trusted domain utilized for processing the payment information to complete the customer transaction session comprises identifying a subdomain associated with the online merchant website in HTML comprising the payment page to determine if the iframe is associated with a trusted domain.

5. The computer-implemented method of claim 1, wherein performing the security action that protects against the potential malware attack comprises alerting the user that the iframe is suspicious.

6. The computer-implemented method of claim 1, wherein the suspicious iframe is a fake iframe injected into the online merchant website.

7. A system for protecting customer payment data against malware attacks on inline frame payment forms, the system comprising:
   at least one physical processor;
   physical memory comprising computer-executable instructions and one or more modules that, when executed by the physical processor, cause the physical processor to:
      detect, by a detection module, a payment form in a payment page on an online merchant website by analyzing, in hypertext markup language (HTML) associated with an inline frame (iframe) embedded on the payment page, a document object model (DOM) to identify the payment form;
      identify, by an identification module, the iframe on the online merchant website, wherein the identification module identifies the iframe on the online merchant website by parsing HTML comprising the payment page to identify the iframe, wherein parsing the HTML comprising the payment page comprises:
         running a background process that displays one or more HTML elements for the payment page; and
         searching for an iframe HTML element utilized for receiving payment information from a user of the online merchant website to complete a customer transaction session;
      determine, by a determining module, whether the iframe is associated with a trusted domain utilized for processing the payment information received from the user of the online merchant website to complete the customer transaction session; and
      perform, by a security module, a security action that protects against a potential malware attack by preventing completion of the customer transaction session upon determining that the iframe is unassociated with the trusted domain, wherein the completion of the customer transaction session is prevented by generating a notification, wherein the notification:
         identifies the iframe that is unassociated with the trusted domain as a suspicious iframe; and
         presents, in a user interface window, options to block and allow a pending browser request for accessing a potentially malicious website pointed to by the suspicious iframe, wherein an execution of the option to block the pending browser request is associated with a potential malware attack comprising an extraction of payment information from the payment form.

8. The system of claim 7, wherein the determining module determines whether the iframe is associated with a trusted domain utilized for processing the payment information to complete the customer transaction session by validating the iframe against a list of trusted hosted iframe locations provided by a payment gateway.

9. The system of claim 7, wherein the determining module determines whether the iframe is associated with a trusted domain utilized for processing the payment information to complete the customer transaction session by identifying a primary domain associated with the online merchant website in HTML comprising the payment page to determine if the iframe is associated with a trusted domain.

10. The system of claim 7, wherein the determining module determines whether the iframe is associated with a trusted domain utilized for processing the payment information to complete the customer transaction session by identifying a subdomain associated with the online merchant website in HTML comprising the payment page to determine if the iframe is associated with a trusted domain.

11. The system of claim 7, wherein the security module performs the security action that protects against the potential malware attack by alerting the user that the iframe is suspicious.

12. The system of claim 7, wherein the detection module analyzes, in the HTML associated with the iframe on the payment page, the DOM to identify the payment form by identifying payment information received from at least one of a third party service provider and a payment gateway during the customer transaction session.

13. The system of claim 7, wherein the suspicious iframe is a fake iframe injected into the online merchant website.

14. A non-transitory computer-readable medium comprising one or more computer-executable instructions that, when executed by at least one processor of a computing device, cause the computing device to:
detect a payment form in a payment page on an online merchant website by analyzing, in hypertext markup language (HTML) associated with an inline frame (iframe) embedded on the payment page, a document object model (DOM) to identify the payment form;
identify the iframe on the online merchant website, wherein the iframe is identified on the online merchant website by parsing HTML comprising the payment page to identify the iframe, wherein parsing the HTML comprising the payment page comprises:
running a background process that displays one or more HTML elements for the payment page; and
searching for an iframe HTML element utilized for receiving payment information from a user of the online merchant website to complete a customer transaction session;
determine whether the iframe is associated with a trusted domain utilized for processing the payment information received from the user of the online merchant website to complete the customer transaction session; and
perform a security action that protects against a potential malware attack by preventing completion of the customer transaction session upon determining that the iframe is unassociated with the trusted domain, wherein the completion of the customer transaction session is prevented by generating a notification, wherein the notification:
identifies the iframe that is unassociated with the trusted domain as a suspicious iframe; and
presents, in a user interface window, options to block and allow a pending browser request for accessing a potentially malicious website pointed to by the suspicious iframe, wherein an execution of the option to block the pending browser request is associated with a potential malware attack comprising an extraction of payment information from the payment form.

15. The computer-implemented method of claim 1, wherein analyzing, in the HTML associated with the iframe on the payment page, the DOM to identify the payment form comprises identifying payment information received from at least one of a third party service provider and a payment gateway during the customer transaction session.

16. The non-transitory computer-readable medium of claim 14, wherein the one or more computer-executable instructions cause the computing device to identify the iframe on the online merchant website by parsing HTML comprising the payment page to identify the iframe.

17. The non-transitory computer-readable medium of claim 14, wherein the suspicious iframe is a fake iframe injected into the online merchant website.

18. The non-transitory computer-readable medium of claim 14, wherein the one or more computer-executable instructions cause the computing device to analyze, in the HTML associated with the iframe on the payment page, the DOM to identify the payment form by identifying payment information received from at least one of a third party service provider and a payment gateway during the customer transaction session.

19. The non-transitory computer-readable medium of claim 14, wherein the one or more computer-executable instructions cause the computing device to determine whether the iframe is associated with a trusted domain utilized for processing the payment information to complete the customer transaction session by validating the iframe against a list of trusted hosted iframe locations provided by a payment gateway.

20. The non-transitory computer-readable medium of claim 14, wherein the one or more computer-executable instructions cause the computing device to determine whether the iframe is associated with a trusted domain utilized for processing the payment information to complete the customer transaction session by identifying a primary domain associated with the online merchant website in HTML comprising the payment page to determine if the iframe is associated with a trusted domain.

* * * * *